United States Patent [19]

Christl et al.

[11] 4,078,604
[45] Mar. 14, 1978

[54] COOLING CHANNEL SURFACE ARRANGEMENT FOR A HEAT EXCHANGER WALL CONSTRUCTION

[75] Inventors: Manfred Christl, Taufkirchen; Karl Butter, Ottobrunn; Helmut Dederra, Ottobrunn; Michael Kaufmann, Ottobrunn, all of Germany; Willibald Wittich, deceased, late of Ottobrunn, Germany, by Renate Wittich nee Padberg, legal guardian, Berlin Germany; Manfred Lechner, Munich, Germany

[73] Assignee: Messerschmitt-Bolkow-Blohm GmbH, Munich, Germany

[21] Appl. No.: 568,832

[22] Filed: Apr. 17, 1975

[30] Foreign Application Priority Data

Apr. 19, 1974 Germany ............................. 2418841

[51] Int. Cl.² .............................................. F02K 11/02
[52] U.S. Cl. ..................... 165/133; 60/39.66; 60/260; 60/267; 165/169; 239/127.1
[58] Field of Search ............... 165/169, 133; 60/39.66, 60/260, 267; 239/127.1

[56] References Cited

U.S. PATENT DOCUMENTS

| 3,131,535 | 5/1964 | Hensley | 165/169 X |
| 3,154,914 | 11/1964 | Stöckel | 60/39.66 X |
| 3,439,502 | 4/1969 | Lee | 60/267 |
| 3,467,583 | 9/1969 | Naimer | 60/267 |
| 3,595,025 | 7/1971 | Stockel et al. | 60/267 |
| 3,692,637 | 9/1972 | Dederra et al. | 60/267 X |
| 3,768,256 | 10/1973 | Butter et al. | 60/260 |
| 3,780,533 | 12/1973 | Huang | 60/260 |
| 3,782,118 | 1/1974 | Butter et al. | 60/260 |
| 3,798,902 | 3/1974 | Butter | 60/260 |

Primary Examiner—Charles J. Myhre
Assistant Examiner—Sheldon Richter
Attorney, Agent, or Firm—Toren, McGeady and Stanger

[57] ABSTRACT

In a heat exchanger wall construction, such as used in regeneratively cooled combustion chambers for liquid fueled rocket engines, the wall construction consists of an inner wall with cooling channels spaced apart by webs. The cooling channels are open on one surface of the inner wall. An outer wall contacts the webs of the inner wall and forms a closure over the openings from the cooling channels. The outer wall consists of an intermediate layer electro-deposited on the surface of the inner wall in which the cooling channels are formed so that it provides a closure surface for the channels. The surfaces of the channels within the inner wall are coated by electro-depositing a layer of gold on them. After forming the gold layer on the surfaces of the cooling channels, the outer surfaces of the webs are etched so that the gold layer extends outwardly from the outer surface of the webs. Next the intermediate layer is deposited and it can be either a single layer or multi-layered. The inner surface of the intermediate layer, whether it is of a single or multi-layered construction, is formed of gold. When the intermediate layer is formed of multiple layers, alternating layers of gold and copper are used.

10 Claims, 7 Drawing Figures

COOLING CHANNEL SURFACE ARRANGEMENT FOR A HEAT EXCHANGER WALL CONSTRUCTION

SUMMARY OF THE INVENTION

The invention concerns a heat exchanger wall construction which is particularly useful for forming the wall of a regeneratively cooled combustion chamber for a liquid fueled rocket engine. Such combustion chamber walls are constructed of a unitary base or inner wall formed of a thermally-conductive metallic material, particularly oxygen-free copper, with continuous cooling channels formed in the outer surface of the inner wall. A cooling medium, such as at least one of the fuel components of the liquid fueled rocket engine are passed through the cooling channels. The cooling channels are open on the outer surface of the inner wall and are covered by an outer wall made up of a relatively thin-walled intermediate layer electro-deposited on the inner wall, and a relatively thick-walled pressure jacket of a high-strength metallic material electro-deposited on the intermediate layer. Further, the invention concerns the method for producing the heat exchanger wall constructions.

Generally, the combustion chamber walls known in liquidfueled rocket engines are formed of materials with a relatively low corrosion resistance and, as a result, it is not possible to use storable liquid fuels, for example, red fuming nitric acid. However, since rocket engines operated with storable liquid fuels are superior to engines operated with cryogenic fuels, because of their availability for immediate use, the object of the present invention is to provide an economically justifiable combustion chamber wall construction which is corrosion resistant to all known storable rocket engine liquid fuels.

Therefore, in accordance with the present invention, the heat exchangers are characterized by thin-walled corrosion resistant layers of electro-deposited gold or similar corrosion-resistant metals on the walls of the cooling channels within the inner wall. Further, the layers formed on the cooling channel walls are arranged to project outwardly from the outer surface of the webs by an amount in the range of 5 to 120 $\mu$ m. The intermediate layer is deposited on the outer surfaces of the webs and over the outer open ends of the cooling channels and consists of gold or similar corrosion-resistant precious metal. The intermediate layer is, for all purposes, completely imperforate and has a thickness of at least 8 $\mu$ m.

The solution of the problem underlying the invention has been realized in practice only under considerable difficulties and in view of the following surprising findings:

(1) Gold can be electro-deposited on the surfaces of the cooling channels within the inner wall without any difficulties in the form of tightly adhering, thin and completely imperforate corrosion-resistant layers. However, despite the thin layer deposited, which is only a few $\mu$ m in thickness at certain points, it is not transformed into a gold-copper alloy by the copper diffusing from the inner wall which would tend to defeat the corrosion protection desired.

(2) Gold can also be electro-deposited on the outer surface of the inner walls and over the open outer ends of the channels by filling the channels with an electrically conductive easily meltable filling material. This intermediate layer electro-deposited on the inner wall is relatively thin, practically completely imperforate, free of imperfection and tightly adhering to the inner wall so that, under ordinary working conditions, not only is adequate corrosion protection afforded, but also there is sufficient tensile strength to prevent the formation of cracks between the inner wall and the pressure jacket, provided that previously unknown procedures are used in the preparation of the outer surface of the inner wall for the electro-deposition of the intermediate layer.

As mentioned above, it was not possible even on the basis of the findings obtained in tests with copper pipes gold plated on the inside with a layer of about 15 $\mu$ m in thickness, to provide an effective corrosion-resistant surface. It was found, at the temperatures existing under the expected operating conditions, that a diffusion of copper into the gold layer would take place and would transform the gold layer into a corrosion-sensitive gold-copper alloy that would not be satisfactory though the method known from German Pat. No. 1,751,691 indicated that thin gold layers of only a few $\mu$ m thickness would be adequate. In the known method the gold plating of the cooling channels was followed by the electro-deposition of the intermediate layer which involved the formation of a gold layer on the base or inner wall instead of a copper layer.

Accordingly, all attempts to produce heat exchanger wall constructions of the above-mentioned type with the cooling channels protected against corrosion by a copper layer, in accordance with the method described in the German Pat. No. 1,751,691 and using low-melting alloys as the filling material, failed because the effectiveness of the gold layers was destroyed in all cases by the formation of an alloy with components from the filling material, presumably tin and/or lead.

Though different filling materials were used, even those in which a number of additional procedures made it possible to obtain heat exchanger wall constructions in the sense of the invention, that is, by the use of filling materials including certain waxes with corresponding coefficients of thermal expansion and softening points on the one hand, and about 10 to 40% by weight of at least semicolloidal graphite powder, related to the weight of the filling material, it was not possible to achieve wall constructions, though numerous attempts were made which could be considered as acceptable solutions of the problem underlying the invention.

Useful results were finally obtained using a method for the formation of heat exchanger wall constructions of the above-mentioned type by prefabricating a one-part base or inner wall of copper with cooling channels formed in the outer surface of the inner wall, filling the cooling channels with an electrically conductive, easily-meltable filling material, electro-depositing a thin intermediate layer on the inner wall over the filling material in the cooling channels and then depositing a relatively thick-walled pressure jacket over the intermediate layer and melting out the filling material from the cooling channels. Using this basic method, the invention is characterized by the electro-deposition of an imperforate, corrosion-resistant gold layer of a thickness of about 5 to 100 $\mu$ m on the walls of the cooling channel within the inner wall. The gold-plated cooling channels are then filled with a material comprising wax and at least semicolloidal graphite powder homogeneously distributed in the wax in an amount of about 10 to 40% by weight, relative to the total weight of the filling material. Any excess filling material is removed by machining and any gold layers and/or temporary, non-conductive coating on the outer surface of the webs are also removed. The exposed surfaces of the filling material are treated with graphite powder and/or metal powder, particularly gold/bronze, in order to improve their conductivity. The outer surfaces of the webs, that is, between the side surfaces of adjacent cooling channels, are etched to a depth of about 5 to 120 $\mu$ m with an etching medium that does not attack gold. The etched surfaces of the webs are then activated and on this prepared base surface, an intermediate layer of gold having a thickness of at least 8 $\mu$ m is electro-deposited, Further, it is provided that the deposition of gold on the outer surfaces of the webs is prevented from the beginning of the deposit of the corrosion-resistant layer on the cooling channel surfaces, preferably by using a temporary, non-conductive coating or, if gold layers are deposited on the outer surfaces of the webs during the formation of the layers on the cooling channel surfaces, such layers are removed completely before the webs are etched. Acccordingly, the outer edges of the gold layers formed on the surfaces of the cooling channels are free of burrs and are flush with the outer surfaces of the webs at the completion of their electro-deposition.

The present invention is based on the utilization of the following surprising new findings;

(1) Imperforate, substantially defect-free intermediate layers of gold covering the cooling channels on the outer surface of the inner wall and firmly adhering to the outer surfaces of the webs, can be deposited, as has been found, on filling materials including wax and at least semicolloidal graphite powder. Further, it has been found advisable in order to be on the safe side, to graphitize the filling material surface to which the gold layer is electro-deposited, for example, by rubbing in graphite powder.

(2) If there is a gold layer on the outer surface of the webs, it is not possible to electro-deposit an intermediate layer which firmly adheres to the webs or which is closed over the cooling channels, since there is no known method which permits, on the one hand, to clean and activate the web surfaces, which are partly or completely coated with gold, so that sufficient adhesion of the electro-deposited intermediate gold layer on the outer surfaces of the webs is insured. Further, this arrangement also tends to a great reduction in the graphite content of the filling material surface. Accordingly, the problem can be overcome by electro-depositing a temporary thin protective layer on the outer surfaces of the webs and/or by depositing an adhesion-enhancing layer of copper.

(3) In contrast to gold-plated web surfaces, webs with a bright copper surface can be cleaned and activated, without excessively reducing the conductivity of the filling material, so that firmly adhering layers of gold can be electro-deposited on the outer surfaces of the webs by etching the copper of the webs at least for a depth of 5 $\mu$ m, if necessary, after preliminary cleaning, particularly degreasing. Preferably the cleaning operation is carried out with an aqueous ammonium persulfate solution and then the web surfaces are pickled with an aqueous hydrogen peroxide-acetic acid solution and scouring it subsequently in a known manner.

In heat exchanger wall constructions embodying the present invention, where a single layer intermediate layer of gold is used, weak points or even interruptions are frequently found at the boundary between the webs and the corrosion-resistant layers covering the cooling channels located in the inner wall. Such defects are due, at least partly, to the difference between the thermal expansion of the inner wall on one hand and of the filling material on the other hand, within the hot gold bath. This effect can never be completely avoided despite great care in the selection of the waxed component in the filling material. Such defects may also occur with deep etching of the web surfaces and also ay be due, in part, to great inhibition of the electro-depositing processes which can always be observed in narrow gaps and surfaces with a low radius of curvature. Despite these weak points and/or imperfections, the intermediate layer formed in accordance with the present invention, provides, as a rule, adequate corrosion protection since the intermediate layer is thickened along the outer edges of the corrosion-resistant layers protecting the side surfaces of cooling channels so that the intermediate layer projects from the open sides of the cooling channels over the adjacent edge surfaces of the webs in the manner of a cap. While this arrangement assures, as a rule, adequate corrosion protection, though not with 100% certainty, in a preferred embodiment according to the invention, three-layered intermediate layers can be utilized where a layer of copper is applied to the first layer bearing directly on the outer surface of the webs and the filling material, which first layer consists of gold, similar to the one layered intermediate layer. To complete the intermediate layer, a third layer consisting of gold is deposited over the second layer. This third layer is sometimes called a gold barrier layer and is electro-deposited on the second layer.

The thickness of the intermediate layer of the heat exchanger wall construction according to the present invention, is preferably about 12 to 200 $\mu$ m.

When a three-layered intermediate layer of the above-described type is used, the first layer consisting of gold is preferably between 10 and 80 $\mu$ m thick. The second layer formed of copper is preferably 20 to 160 $\mu$ m thick and the third or gold barrier layer is preferably 6 to 60 $\mu$ m thick. In a preferred embodiment of the invention, the projection of the corrosion-preventing layer on the side surfaces of the cooling channels outwardly from the outer surfaces of the webs, is about 10 to 80 $\mu$ m and, more specifically, about 30 to 70 $\mu$ m. The minimum value for the projection of the corrosion-resistant layer outwardly from the outer surface of the webs is partly necessary because the etching and activation treatment to which the web surfaces must be subjected, must be carried out with a certain intensity, which leads to the removal of a considerable amount of material from the webs so that an imperforate, firmly adhering intermediate layer of gold can be electro-deposited on the webs. It follows, therefore, that the thickened form of the intermediate gold layer along the outer edges of the corrosion-resistant layers lining the cooling channels, affords a cover for such layers in the manner of a cap and such a covering is insured only when the corrosion-resistant layers of the cooling channel surfaces project at least 5 $\mu$ m outwardly from the outer surfaces of the webs. The upper limit of the projection of the corrosion-resistant surfaces outwardly from the outer surfaces of the webs, is based on the finding that weak angles, and possibly even occulusions may occur in the range of the corners between the web surfaces and the corrosion-resisting layers in the pressure jacket material or if multi-layered intermediate layers are deposited, in the second layer of the intermediate layer if the webs are edged to a depth of more than 120 μ m.

In accordance with the present invention, the pressure jacket is formed preferably of copper, nickel, a nickel-cobalt alloy, or an equivalent electro-depositable material. Apart from its excellent thermal conductivity, copper has the advantage that it can be deposited easily in thick, firmly adhering layers onto the intermediate layer. Nickel alloys are of particular advantage as the pressure jacket material, since such material has a certain heat-shielding effect, which is especially advantageous when the heat exchanger wall construction of the present invention is used for rocket engines, and has, on one hand, not only a high tensile strength but also a lower coefficient of thermal expansion than the material forming the base, that is, copper, so that, as the wall construction becomes heated in operation and the base or inner wall expands more than the pressure jacket, a particularly tight and firm bearing of the pressure jacket on the inner wall is achieved. Further, the tensile stress conditions in the intermediate layer are improved, such conditions resulting from the high pressure difference between the fuel components flowing through the cooling channel as the cooling medium and the relatively low pressure inside the rocket engine combustion chambers. This occurs particularly in the rear of the combustion chambers and is considerably reduced in a range between the webs and the pressure jacket and, as a rule, it is even over compensated. Another advantage of the pressure jackets whose coefficient of thermal expansion is smaller than that of the web is that, when the heat exchanger construction becomes hot, the parts of the intermediate layer between the pressure jacket and the top sides of the webs are subjected to a high compressive stress, whereby, on one hand, any imperfections or pores at the seams between the corrosion-resistance layers and the intermediate layer are sealed. In addition, a desirable copper-gold diffusion layer is formed in the intermediate layer, which at least partly compensates the loss of strength, particularly hot strength, found in electro-deposited gold layers when they are heated to about 200° c or more due to a structural information.

In another preferred embodiment of the invention, the cooling channels formed in the heat exchanger wall construction have rounded or chamfered edges or transitions between the bottom wall and the side walls of the channels, since the difference in thickness of the electro-deposited corrosion-resistant layers varies between the outer open ends of the cooling channels and the transition range between the side walls and bottom wall of the cooling channels, and the bottom thickness is much greater in channels having rounded bottoms than in rectangularly shaped cooling channels.

Any gold deposited on the outer surfaces of the webs during the electro-deposition of the corrosion-resistant layer on the surfaces of the cooling channels, if the outer web surfaces are not covered with a non-conductive coating, such as a varnish coat, must be removed. The removing operation can be performed by filling the cooling channels with a preferably thermoplastic synthetic resin overturning the inner wall, and removing the plastic filling from the cooling channels and bending any burrs formed during the overturning by means of a tool which does not damage the corrosion resistant layers; and then removing the burrs with a gentle abrasive, for example, a fine-grained emory. Such a procedure is obviously extremely elaborate and it is preferable if the gold is prevented from being deposited on the outer surfaces of the webs during the electro-plating of the cooling channels by coating the outer surface of the webs with a non-conductive material, for example, a varnish coating. Such a temporary coating can be applied only on the outer surfaces of the webs between the cooling channels or it can be placed on the entire outer surface of the inner wall before the cooling channels are cut. This second coating procedure is less involved and, therefore, it is preferred in accordance with the invention. As a filling material for the cooling channels, it is preferable to use homogeneous mixtures of about 60 to 90%, preferably 70 to 80% by weight of a wax, and 40 to 10% and preferably 30 to 20% by weight of a very fine-grained, at least semicolloidal graphite powder. The melting behavior of the wax suitable for use as a filling material is important, because on one hand, the filling material must not be too brittle at the temperatures existing as a method of forming the wall construction is carried out and, on the other hand, the wax must still be capable of being melted out at relatively low temperatures. Finally, it is important that the filling material not be too soft at the temperatures prevailing in the electro-plating baths, especially the gold bath from which the intermediate layer is deposited.

Preferably, the base or inner wall of the heat exchanger wall construction is preheated to a temperature of about 50 to 110° C for introducing the filling material into the cooling channels, or the inner wall is kept at a temperature in this range to obtain a possibly defectfreewetting of the cooling channel walls by the filling material.

In another embodiment, the filling material can be introduced into the cooling channels by melting correspondingly preshaped strips of filling material in the channels by means of a soldering iron which preferably has a silver surface.

After the filling material is introduced into the channels, the temperature of the inner wall should be kept within a range of about 40° to 80° C until the inner wall prepared for the electro-deposit of the intermediate layer has been introduced into the bath for forming such layer whose temperature is about 60° C, in order to prevent the detachment of the filling material from the cooling channel walls and any excessive outflow of the filling material from the channels, due to the heating in the electro-plating bath.

For etching or back-etching of the outer surfaces of the webs, in accordance with the present invention, it is preferable to use aqueous ammonium persulfate solutions with an ammonium persulfate content of about 5 to 25% by weight, and particularly about 8 to 15% by weight.

It has been found particularly advisable to etch the webs at first anodically, preferably with a current density of about 1 to 6 A/dm$^2$ preferably for about 10 to 30 minutes, and then without current, preferably for about the same period of time.

The subsequent activation of the etched webs is effected is a preferred manner with a special aqueous pickling solution which contains about 2 to 10%, preferably about 4 to 6% by weight hydrogen peroxide, and 2 to 10%, preferably 4 to 6% by weight acetic acid. The pickling solution can also be used advantageously for activating all other copper surfaces which are to be coated with an electro-deposit in the course of the construction of the heat exchanger wall structure.

On the base or inner wall thus prepared for the formation of the intermediate layer, if desired, a conductive and adhesive layer of copper can be electro-deposited with a thickness of not more than a few μ m before the intermediate layer or the first layer of the intermediate layer is applied, however, this does not offer any special advantages.

After the electro-deposit of the intermediate layer, or if a three-layered intermediate layer is to be formed, after the deposit of the first gold layer of the intermediate layer, it is advisable to check the electro-deposited layer for visible imperfections or pores, if necessary, with a magnifying glass. Any pores or imperfections which are found can be closed by means of a metal pin, particularly a precious metal pin and such an operation can be carried out because of the ductility of the gold layer deposited. Such pores or imperfections may appear, despite careful processing, along the boundary between the cooling channels and the webs. This precaution against openings through the layer is particularly advisable if only a single-layered intermediate layer of gold is electro-deposited. When three-layered intermediate layers are used, which are preferred according to the invention, small pores or imperfections in the first layer deposited are less critical, because copper, which is deposited as the next layer, has the capacity, unlike gold, to effect rapid closing of any pores or imperfections. The gold barrier layer which is deposited as the third layer over the second or copper layer, is completely free or pores or imperfections as far as can be determined so that a few minor imperfections in the first layer of the intermediate layer are not harmful and cannot cause any major corrosion damage.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING IN THE DRAWING

DETAILED DESCRIPTION OF THE INVENTION

Figure 1:
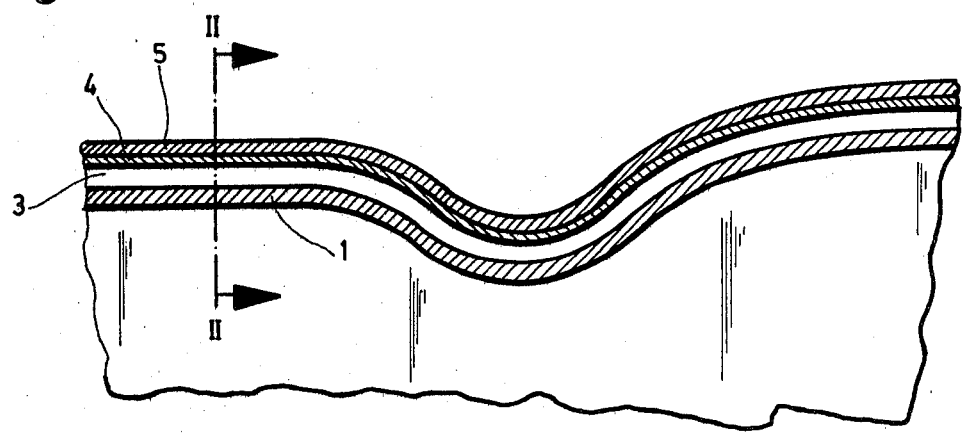
FIG. 1 is a partial longitudinal view of combustion chamber with discharge nozzle for a liquid-fueled rocket engine incorporating the heat exchanger wall construction of the present invention as the wall forming the combustion chamber.
Figure 2:
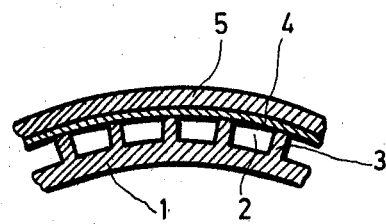
FIG. 2 is a sectional view taken along the line II — II of FIG. 1.

In FIG. 1, a combustion chamber and discharge nozzle for a liquid-fueled rocket engine is shown in longitudinal section including an inner wall 1 and an outer wall consisting of an intermediate layer 4 and a pressure jacket 5. The base or inner wall 1 has an inner surface defining the wall surface of the combustion chamber and discharge nozzle and an outer surface which contacts the inner surface of the intermediate layer 4. The inner wall 1 is formed of oxygen-free copper and its outer surface, note FIG. 2, has a plurality of longitudinally-extending continuous cooling channels 2 which are open at the outer surface of the inner wall. The cooling channels 2 are spaced laterally apart by webs 3 with the outer surfaces of the webs located in the same curved plane with the open outer ends of the cooling channels. The inner wall can be prefabricated in a known manner from a copper ingot, for example, by forging (solidified in the structure) and it can be finished by a metal cutting operation.

Figure 3:
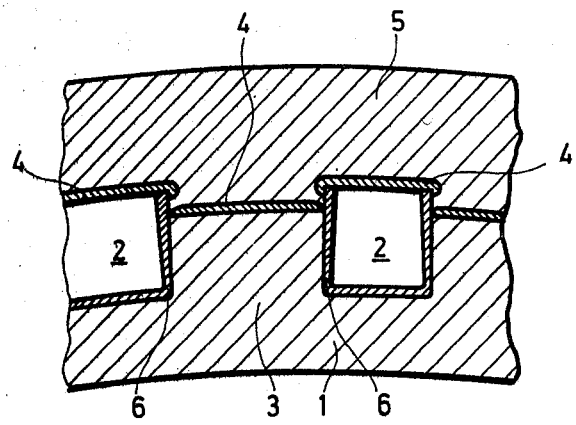
FIG. 3 is an enlarged detail view of the sectional view shown in FIG. 2.

The cooling channels 2 are cut into the outer surface of the inner wall and, as mentioned above, are separated by the webs 3. The cooling channels are defined withing the inner wall by a pair of oppositely disposed side surfaces and by a bottom surface spaced inwardly from the outer surface of the inner wall. Though not shown in FIGS. 1 and 2, the side wall and bottom surfaces of the cooling channels are covered with an electro-deposited corrosion-resistant layer 6 of gold and, as illustrated in FIG. 3, the layers forming the side walls project outwardly beyond the outer surfaces of the webs. The open outer ends of the cooling channels 2 and the outer surfaces of the webs 3 are covered with a practically imperforate intermediate layer 4 which, in turn, is enclosed by an electro-deposited relatively thick-walled pressure jacket formed of copper, nickel, nickel-cobalt alloy or an equivalent material.

From the enlarged detail view of the wall construction shown in FIG. 3, it can be seen that the thickness of the corrosion-resistant layer 6 decreases inwardly toward the bottom of the cooling channel and is extremely thin in the range of the transition or edge between the side walls and the bottom of the cooling channel. As illustrated, the side walls and the bottom of the channels are disposed at right angles to one another. Furthermore, in FIG. 3 it shows that the layers convering the side walls of the channels project slightly outwardly from the outer surfaces of the webs and a single layer intermediate layer 4 is represented over the outer surfaces of the webs and the open outer ends of the cooling channels and is irregular in its thickness. The intermediate layer 4 has a thin area or seam where it comes in contact with the outer surface of the corrosion-resistant layer 6. As can be seen in FIG. 3, the portion of the intermediate layer 4 bearing on the outer surface of the webs is thinner along the outer edges of the outer surface of the webs where it contacts the outer surface of the layer coating the side wall of the cooling channel, than the central region between the edges of the webs. The portion of the intermediate layer located above the upper or outer edge of the corrosion-resistant layer 6, on the web side of the layer 6 is thicker and has a rounded configuration as compared to the remainder of the intermediate layer extending over the open outer end of the cooling channel. The intermediate layer covers the layer 6 lining the cooling channel in the manner of a cap extending slightly downwardly over the outer ends of the layer 6.

Figure 4A:
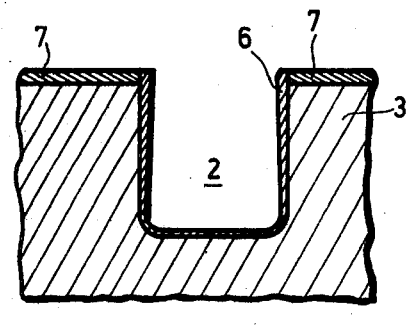
FIGS. 4A –4D are enlarged detail views of a transverse sectional view through a cooling channel as shown in FIGS. 2 and 3 and illustrating a preferred embodiment of the heat exchanger wall construction at various phases in the manufacturing process.

In FIG. 4A, a transverse sectional view of a cooling channel 2 is shown enlarged compared to FIG. 3 and the transition from the side walls to the bottom of the channel is rounded off. The side walls and bottom of the channel are already coated with the corrosion-resistant layer 6 which is thinner as it extends inwardly from the outer surface of the inner wall 1 and along the bottom of the cooling channel. Further, in FIG. 4A, a nonconductive coating 7 is formed on the outer surface of the web 3 between the cooling channels. The layers 6 project beyond the outer surfaces of the webs 3 for approximately the thickness of the non-conductive coating 7.

Figure 4B:
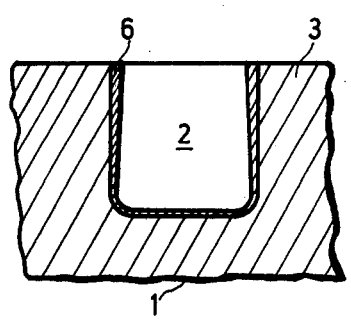

FIG. 4B is a view similar to FIG. 4A, however, the cooling channel is filled with the filling material and the coating 7 as well as the burrs of the gold layer 6 projecting outwardly beyond the webs have been removed.

Figure 4C:
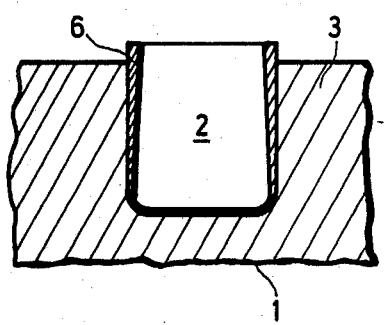

In FIG. 4C the outer surfaces of the webs, that is, the outer surfaces of the inner wall, as shown in FIG. 4B have been etched inwardly for a depth of 3 to 50 $\mu$ m, this is the most important feature in the formation of the heat exchanger wall construction in accordance with the present invention.

Figure 4D:
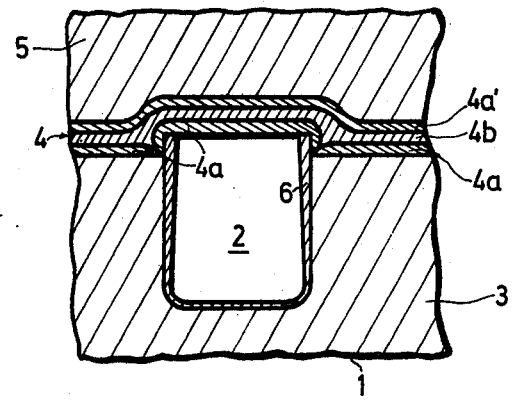

FIG. 4D shows the same cross-sectional view of the inner wall 1 with the cooling channel 2 with a three-layered intermediate layer 4 which has been electro-deposited onto the outer surfaces of the webs and spanning the open outer surface of the cooling channel 2. Of course, the cooling channel is filled with the electro-conductive filling material which provides the support for the intermediate layer. The intermediate layer is formed of three layers with the first layer 4a deposited directly on the outer surface of the webs and across the open outer end of the cooling channel, it is formed of gold and has a construction similar to that shown in FIG. 3. That is, the intermediate layer forms a cap-like cover over the corrosion-resistant layer 6 lining the cooling channel so that the layer 4A is thickened and extends downwardly about the outer ends of the layer 6. A second layer 4b consisting of copper is deposited over the first layer and a third layer or gold barrier layer 4a' is electro-deposited over the copper layer. The pressure jacket 5 is, in turn, electro-deposited on the outer surface of the gold barrier layer.

The following examples and comparison tests will illustrate the invention.

EXAMPLE I

Four heat exchangers consisting of copper inner walls or bases with recessed cooling channels in their outer surface are each produced according to a different method, note Table 1 below, that is, two formed according to the method of the invention (methods 1 and 2) and two formed according to other methods (methods 3 and 4), were provided with a corrosion-resistant layer and an intermediate layer of gold, which was deposited in methods 2 and 4 on an adhesive copper layer of only about 1 to 2 $\mu$ m thickness.

The following materials and operating conditions were used:

1. Anodes: platinum-coated titanium-expanded metal sheets with a platinum coat of about 1.5 $\mu$ m thickness.

```
2. Gold bath:
   a) gold content           = 12 to 15 g/liter
   b) current density        = 0.5 A/dm²
   c) bath density           = 14 to 18 deg. Be
   d) bath temperature       = 52° C.
   e) bath movement          = vigorous
   f) pH-value               = 5.5 - 6.5
   g) current yield          = 7.1 g Au/A -hour
   h) electroplating time for 1 μ m at 0.5 A/dm² = 3 min
3. Copper bath (self-regulating, acid)
   a) copper sulfate         = 220 g/liter
   b) sulfuric acid          = 85 g/liter
   c) chlorine ions          = 40 to 50 mg/liter
   d) polishing paste (SR 300) = 1 g/liter
   e) wetting agent (SR 400) = 10 ml/liter
```

-continued
```
   f) bath temperature         = 27 to 35 deg. C
   g) cathodic current density = 8 to 15 A/dm²
   h) anodic current density   = up to a max. of 7 A/dm²
   i) continuous filtration
4. Polishing solution.
   a) H₃PO₄ (85%) = 60% by volume
   b) CH₃COOH (95%) = 30% by volume
   c) HNO₃ (65%) = 10% by volume
(Surface removal at room temperature on copper surfaces;
ab. 1 μ m/min.).
5. Etching medium; ammonium persulfate pickle of 10%
   by weight (NH₄)₂S₂O₈ and water.
6. Activating solution:
   a) H₂O₂ (30%) = 5% by volume.
   b) CH₃COOH (95%) = 5% by volume
   c) Water = balance
7. Scouring solution:
   10% aqueous sulfuric acid solution.
8. Cyanide solution (for initial etching of gold
   surfaces with or without current)
   a) NaCN = 4% by weight
   b) H₂O₂ = 4 ml/liter
   c) water = balance
9. Filling material:
   a) wax (bernite H115) = 73% by weight
   b) graphite (semicolloidal) = 28% by weight
```

The cooling channels in the copper base or inner wall are gold-plated for two hours at 52° C in the gold bath with 0.5A/dm², then filled with the filling material, any excess filling material is removed mechanically and then treated in the manner shown in Table I (rinsing, polishing, scouring and activating treatment are not indicated for neatness' sake). The finished heat exchanger wall construction was cut into several test pieces which were subjected to different heat treatments for studying their diffusion behavior. To determine their adhesive strength, standard samples were tested which had been produced in accordance with the four methods.

In the heat exchanger wall constructions in accordance with the present invention, formed in accordance with methods 1 and 2, the covering provided by the intermediate layer over the channel was homogeneous and free of pores. Though the corrosion-resistant layer, which was formed by machining, particularly in the wall construction produced according to method 1, did not adhere to the intermediate layer, there was a tight seal at the location between the layer lining the channels and the intermediate layer where it is thickened at the outer edges of the corrosion-resistant layer and where it provides a cap-like covering.

In the heat exchanger wall constructions not formed in accordance with the present invention, and produced according to methods 3 and 4, the covering over the cooling channel was very poor and there was no continuous intermediate layer.

EXAMPLE 2

To be able to determine the influence of various measures on the tightness of the covering over the open outer ends of the cooling channels by the intermediate layer and the strength of the bond between the outer wall (pressure jacket-intermediate layer and the inner wall or base), we developed the following standard test.

Cylindrical segments of the material forming the inner wall, oxygen-free copper, were provided with exactly centered and calibrated bores, degreased by steam, treated for ten minutes with a polishing solution, rinsed, treated for ten minutes with an activating solution, rinsed, gold-plated in the gold bath for 80 minutes with a current density of 0.5 A/dm², providing the formation

TABLE I

| Gold deposit removed mechanically from the webs and underlying copper etched away ab. 80μ m deep. | | Gold deposit not removed from the webs. | |
|---|---|---|---|
| Method 1 | Method 2 | Method 3 | Method 4 |
| 1. Gold layer removed mechanically from the webs. | 1. Ditto | 1. Surface of filling material graphitized. | 1. Ditto |
| 2. Surface of filling material graphitized. | 2. Ditto | 2. Cleaning of gold-plated webs by anodic treatment in cyanide sol. at 150 A/ dm². | 2. Ditto |
| 3. Webs etched with etching medium about 80 μm deep. | | 3. Intermediate layer of gold electro-deposited. | 3. Adhesive copper layer electro-deposited. |
| 4. Intermediae layer of gold electro-deposited. | | | |
| 5. Thickly copper-plated. | | 4. Thickly copper-plated | 4. Intermediate layer of gold electro-deposited |
| Heat exchangers according to the invention. | | | 5. Thickly copper plated. |
| | | Heat exchangers not according to the invention (but not according to the state of the art either). | | of the corrosion-resistant layer, and filling the cooling channel with filling material, after which the gold layer was removed from the outer surface of the inner wall, and the surface of the filling material was graphitized.

On this pre-treated standard simple base is electro-deposited, in accordance with the method to be tested, at least a single-layer coating of a total of 3 to 4 mm. in thickness, parts of the sample which are not to be electro-plated are preferably covered first, for example, with plastic, and the coating is then machined as accurately as possible, so that the annular surface of the standard sample base covered by the coating has exactly a known given size.

Next the filling material is melted out and the coating is burst off hydraulically. The strength of the bond between the coating and the base (adhesion) can then be easily calculated from the measured pressure and the known values of the cross-sectional area of the cylindrical bore as well as of the annular contact surface between the coating and the base of the standard sample.

On standard samples produced according to the invention, similar to method 1 to Example 1, it was found that the adhesion at room temperature was mostly over 20 kp/mm², but there were outliers with adhesions of only abut 16.5 to 71.8, and in one case, only 10.30 kp/mm². In order to determine whether these outliers can be avoided in the preferred embodiment of the invention with a multi-layered intermediate layer and the manner in which adherence is achieved in the heat exchangers of the present invention, compared to those heat exchangers with one intermediate layer or a complete outer covering of electro-deposited copper, we made the following tests:

Fourteen standard samples bases, produced as indicated above, were:

(a) etched for 20 minutes in the etching solution at 3 A/dm².

(b) etched for about 20 minutes without current in the etching medium.

(c) rinsed.

(d) activated for 20 minutes in the activating solution.

(e) rinsed, and (f) scoured with scouring solution.

Seven of the pretreated standard samples bases were subsequently only thickly copper-plated, while the remaining seven were treated as follows:

(1) rinsing, (2) gold-plating for 20 minutes (gold bath 0.5 A/dm²).

(3) copper plating in the copper bath for 15 minutes at 3 A/dm² and then for 90 minutes at 4A/dm²

(4) rinsing, (5) scouring with scouring solution, (6) rinsing, (7) gold-plating for 60 minutes (gold bath 0.5 A/dm²), (8) rinsing, (9) cathodic degreasing (in "EL 63"),

(10) Scouring with scouring solution and

(11) Thick copper-plating.

In the determination of the adhesion of the standard samples thus produced we obtained the following results compiled in Table II.

Table II

| Invention (Au-Cu-Au-intermediate layer) | | Reference (Cu-cover) | |
|---|---|---|---|
| Sample no. | Adhesion (kp/mm²) | Sample no. | Adhesion (kp/mm²) |
| 1A | 23.1 | 1 B | 22.6 |
| 2A | 21.1 | 2 B | 20.6 |
| 3A | 22.9 | 3 B | 24.4 |
| 4A | 27.0 | 4 B | 20.6 |
| 5A | 22.9 | 5 B | 21.1 |
| 6A | 25.7 | 6 B | 21.6 |
| 7A | 23.6 | 7 B | 23.1 |
| Mean value | 23.9 | Mean value | 22.0 |

The foregoing results show that not only are there no outliers in the heat exchangers according to the invention with a three-layered intermediate layer whose adhesion is under 20 kp/mm², but the adhesion at room temperature is on the average of 23.9 k/mm², which surprisingly is much higher than that of the standard samples where no intermediate gold layer is provided.

While the specific embodiments of the invention have been shown and described in detail to illustrate the application of the inventive principles, it will be understood that the invention may be embodied otherwise without departing from such principles.

We claim:

1. In a heat exchanger wall construction especially for a wall forming regeneratively cooled combustion chambers for liquid fueled rocket engines, comprising a unitary inner wall formed of oxygen-free copper, said inner wall having an inner surface and an outer surface with the inner surface arranged to be contacted by a high-temperature medium, said inner wall shaped to provide cooling channels extending inwardly from said outer surface toward and spaced from said inner surface, and said inner wall including webs positioned between and laterally spacing said cooling channels and defining the outer surface of said inner wall, said cooling channels being open at the outer surface of said inner wall, said cooling channels arranged to be traversed by at least one cooling medium such as one of the fuel components used in a liquid-fueled rocket engine, an outer wall covering the outer surface of said inner wall and said outer wall comprising an electro-deposited relatively thin-walled intermediate-layer formed on said inner wall and spanning and closing the outer open ends of said cooling channnels and a relatively thick-walled pressure jacket formed of a high-strength metallic material electro-deposited on the surface of said intermediate layer, wherein the improvement comprises an electro-deposited thin-walled corrosion-resistant layer formed of a metal selected from the group consisting of gold and precious metals having a corrosion-resistant characteristic equal to that of gold being placed on the sides of said cooling channel formed by said webs and the bottom of said cooling channels spaced inwardly from said outer surface, said layer on the sides of said cooling channels extending outwardly beyond the outer surface of said inner wall formed by said webs for a dimension in the range of 5 to 120 $\mu$ m, and said intermediate layer at least on its surface facing the outer surface of said inner wall being formed of a metal selected from the group consisting of gold and precious metals having a corrosion-resistant characteristic equal to that of gold and forming an imperforate layer having a thickness of at least 8 $\mu$ m.

2. A heat exchanger wall construction, as set forth in claim 1, wherein the corrosion-resistant layer on the side surfaces of said cooling channels projects outwardly from the outer surface of said webs by about 10 to 80 $\mu$ m.

3. A heat exchanger wall construction, as set forth in claim 1, wherein said pressure jacket is formed of one of the group consisting of copper, nickel and a nickel/cobalt alloy.

4. A heat exchanger wall construction, as set forth in claim 1, wherein said cooling channels have a rounded transition from the side walls of said channels to the bottom thereof.

5. A heat exchanger wall construction, as set forth in claim 1, wherein the transition between the side walls of said cooling channels and the bottom thereof has a chamfered configuration.

6. A heat exchanger wall construction, as set forth in claim 1, wherein the said corrosion-resistant layer on the sides of said cooling channels projects outwardly from the outer surface of said webs by 30 to 70 $\mu$ m.

7. A heat exchanger wall construction, as set forth in claim 6, wherein pressure jacket is formed of a material having a lower coefficient of thermal expansion than copper.

8. A heat exchanger wall construction, as set forth in claim 1, wherein said intermediate layer is a multi-layered structure comprising at least three layers with the first and third layers consisting of electro-deposited gold spaced apart by an electro-deposited second layer of oxygen-free copper.

9. A heat exchanger wall construction, as set forth in claim 8, wherein said intermediate layer has a thickness in the range of 12 to 200 $\mu$ m.

10. A heat exchanger wall construction, as set forth in claim 8, wherein said first layer of said multi-layered intermediate layer in direct contact with the outer surface of said inner wall is about 10 $\mu$ m thick, the second layer in contact with said first layer is about 20 to 160 $\mu$ m thick and the third layer in direct contact with said second layer is a safety corrosion barrier layer and is about 5 to 60 $\mu$ m thick.

* * * * *